J. DELFINO.
AXLE BOX OR WHEEL HUB BOX AND LUBRICATING CUP FOR PLOW WHEELS.
APPLICATION FILED AUG. 28, 1919.
1,364,484.
Patented Jan. 4, 1921.
2 SHEETS—SHEET 1.
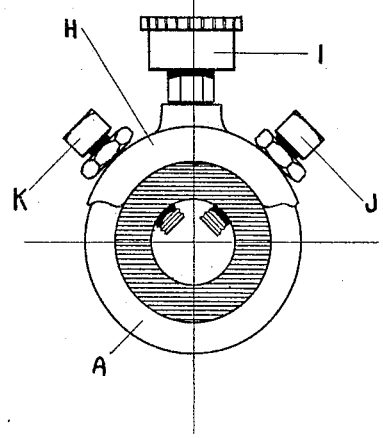
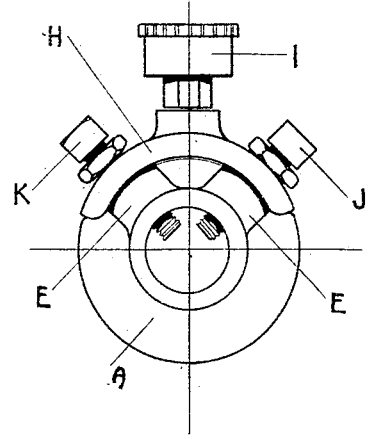
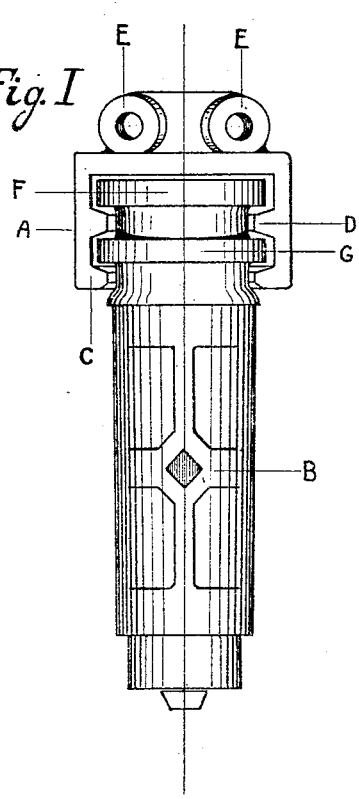
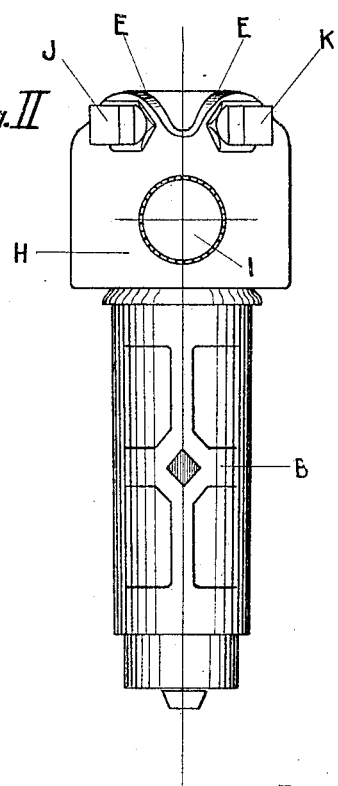
Inventor
J. Delfino
By H. R. Kerslake
Attorney

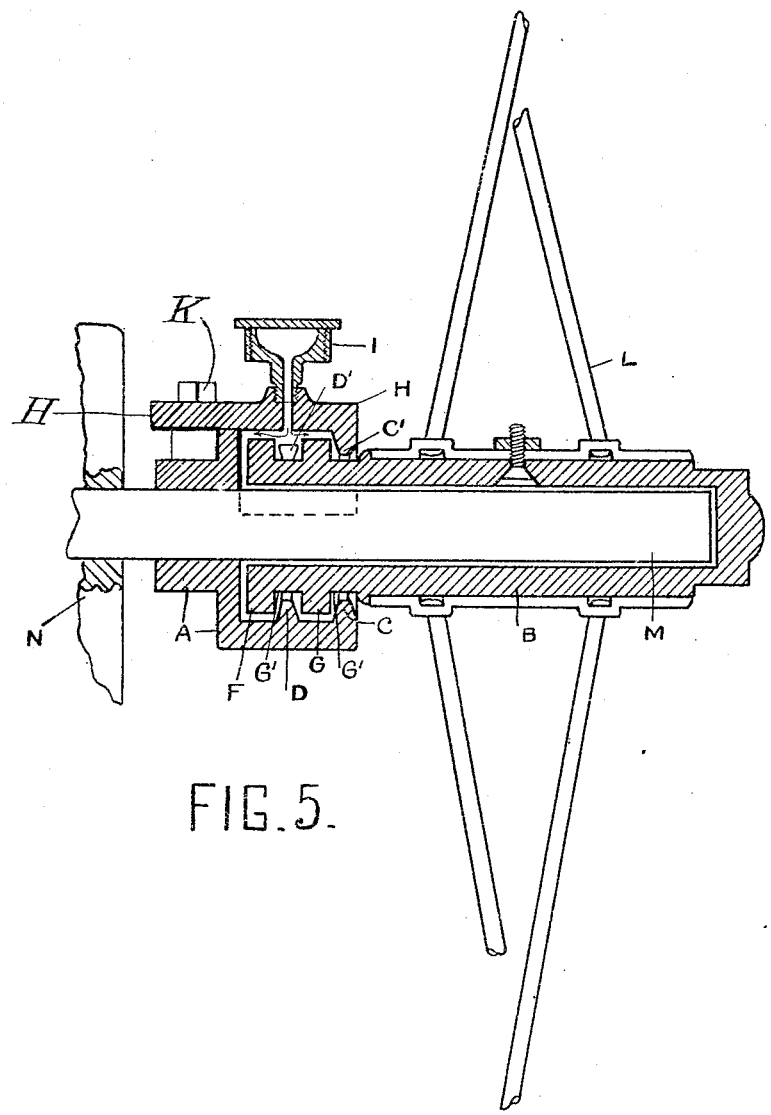

UNITED STATES PATENT OFFICE.

JOSÉ DELFINO, OF BUENOS AIRES, ARGENTINA.

AXLE-BOX OR WHEEL-HUB BOX AND LUBRICATING-CUP FOR PLOW-WHEELS.

1,364,484.     Specification of Letters Patent.     Patented Jan. 4, 1921.

Application filed August 28, 1919. Serial No. 320,517.

*To all whom it may concern:*

Be it known that José Delfino, a subject of the King of Italy, residing at Buenos Aires, Argentine Republic, has invented certain new and useful Improvements in Axle-Boxes or Wheel-Hub Boxes and Lubricating-Cups for Plow-Wheels, of which the following is a specification.

The present invention relates to improvements in axle or wheel hub boxes and lubricating cups for plow wheels, the employment of which insures a greater solidity and strength during the working operation, as these parts are conveniently reinforced thus providing greater durability than exists in systems which are actually in use, due in part to the constant lubrication of the various parts which are subjected to hard and active work.

Taking into account the fact that these implements are used in fields where the earth is constantly removed, the present improvement is almost indispensable when it is desired to secure the maximum of efficiency during the working operation.

In order that the present invention may be clearly understood and readily carried out, the same is clearly illustrated in the accompanying drawings in which:—

Figure 1 is a top plan detail of the axle or wheel hub box with a lubricating cup removed.

Fig. 2 is a similar view of the same wheel hub box with the lubricating cup applied.

Fig. 3 is a rear elevational view of the arrangement showing particularly the lubricating cover.

Fig. 4 is a front elevational detail of the cover and cup the wheel hub box being shown in section, and Fig. 5 is a sectional elevational view of the parts when assembled and applied in proper position.

Referring now, more particularly, to the accompanying drawings there is provided an axle box or wheel hub box B the inner end portion of which is provided with two annular flanges F, G integral therewith and in addition the box is provided with spaced annular grooves, G' adjacent the inner sides of the said flanges.

A lubricating box A is employed and has formed integral therewith spaced inwardly extending flanges D and C which are positioned in the corresponding grooves G' in the axle or wheel hub box when the lubricating box is applied to the wheel hub box and act to retain the wheel hub box in position. A cover H of arcuate configuration is provided for the lubricating box A and is also formed on its inner surface with flanges D' C', which are arranged in the grooves G' and aline with the flanges D and C so as to in effect form two annular flanges.

As is apparent, the lubricating box at its outside edge is provided with two seats E which are disposed in a diagonal line in relation with the axle of the piece (Fig. 3), and through which seats pass threaded members or pins J, K which secure the cover H to the box A and at the same time secure the box A to the axle and in consequence retain the wheel hub box B in position.

A lubricating cup I is mounted at the top of the cover H and is arranged in communication with the grooves and lubricates effectively the internal fixed parts and those which are moving, thereby avoiding the wearing of the same and in addition preventing heating of the parts while running by reason of lack of lubrication.

In Fig. 5 the arrangement is shown assembled, the wheel L being secured to the wheel hub box B which in turn is revolubly mounted on the axle M. The axle M is mounted in a suitable support N, the axle being preferably fixed, while the pins J, K are adapted to engage the axle and frictionally clamp the box A thereon so that the box A will act to lubricate and retain the wheel hub box B during working operation.

It is believed that in view of the foregoing that a further detailed description of the invention is entirely unnecessary. Likewise it is believed that the advantages of the invention will be readily apparent.

Having thus fully described the invention what is claimed and desired to be secured by Letters Patent is:—

1. In a device of the character described, a rotatable wheel hub box provided with alternately arranged annular flanges and grooves, a lubricating box arranged about the inner portion of the wheel hub box and provided with internal flanges for coacting with the flanges and the grooves on the wheel hub box, a cover mounted on the lubricating box and provided also with flanges for coacting with the grooves and flanges on the wheel hub box, a lubricating cup carried by the cover and in communication with the grooves, and common means for fastening the cover to the lubricating box and the lubricating box in a rigid stationary position.

2. A device of the character described including in combination a rigidly mounted axle, a wheel hub box rotatably received on the axle, spaced annular flanges on the outer surface of the inner portion of the wheel hub box, the hub being also provided with annular grooves positioned adjacent the inner sides of the flanges, a lubricating box embracing the inner end of the wheel hub box, a cover for the lubricating box, the lubricating box and the cover being provided with spaced annular flanges for loosely engaging the grooves in the wheel hub box, a lubricating cup on the cover, and common means for fixing the cover to the lubricating box and the lubricating box to the axle thereby retaining the wheel hub box on the axle.

In testimony whereof I affix my signature in presence of two witnesses.

JOSÉ DELFINO.

Witnesses:
J. WEGEY,
S. J. CERAF.